April 25, 1967  P. C. HANLON  3,315,968
FRICTIONAL RING SEALS FOR ROTATING SHAFTS
Filed Oct. 23, 1964

INVENTOR.
PAUL C. HANLON
BY Arthur J. Robert
ATTORNEY

United States Patent Office 3,315,968
Patented Apr. 25, 1967

3,315,968
FRICTIONAL RING SEALS FOR ROTATING SHAFTS
Paul C. Hanlon, Louisville, Ky., assignor to Dover Corporation, Washington, D.C., a corporation of Delaware
Filed Oct. 23, 1964, Ser. No. 405,936
5 Claims. (Cl. 277—3)

The present invention relates to frictional ring seals for rotating shafts. More particularly, it relates to frictional ring seals for controlling the axial flow of fluid leaking to atmosphere from the high-pressure end of the rotary pumps, turbines, compressors and like devices. At the lower fluid pressures, satisfactory frictional seals may be readily produced. However, as the pressures progressively increase, it becomes necessary to use closer tolerances between the frictional sealing surfaces. As the tolerances are reduced, the rate of wear is increased. Consequently at the higher pressures, quicker failures are encountered. This presents a problem.

The principal object of the present invention is to provide a frictional ring seal, the frictional sealing surfaces of which have a substantially reduced and relatively low rate of wear under the higher pressure conditions.

Another important object of the invention is to provide a frictional ring seal comprising: a sealing ring so arranged that it provides frictional seals only along its radially-extending side faces; and means for balancing such ring axially so that its side faces can be machined to extremely close tolerances without incurring the higher rates of wear normally resulting from such close tolerances when such side faces are axially loaded.

Rotary pumps, turbines, compressors and like devices conventionally comprise: an outer stationary housing part providing a bore wall having high and low pressure ends; and an inner rotatable shaft part operatively mounted for relative rotation within said bore wall with its periphery spaced inwardly from the bore wall and cooperating therewith to form a concentric cylinder of space around the shaft part.

The objects of the present invention are achieved by providing that concentric cylinder of space with a frictional ring seal comprising: (A) a series of three axially-abutting shaft-encircling rings arranged in the cylindrical space between said bore wall and shaft, each ring having radially-extending side faces and inner and outer peripheries, one of which is to be mounted and the other free, the first and third rings having their mounted periphery on one part, the second ring having its mounted periphery on the other part, (1) the free periphery of each ring being spaced from the adjacent part to form therebetween a non-sealing ring chamber accommodating a flow of leakage fluid axially in the direction of the low pressure end, and (2) the axially-abutting side faces of said rings cooperating with each other to form (a) a first frictional seal extending radially between the first and second rings to restrict the radial flow of leakage fluid from the first ring chamber to the second ring chamber, and (b) a second or split frictional seal extending radially between the second and third rings with its outer end connected to the second ring chamber and its inner end connected to the third ring chamber; (B) means providing a pressure equalizing passageway interconnecting said second and third non-sealing chambers to establish substantially identical fluid pressures at opposite ends of said second frictional seal; and (C) means for balancing said second ring axially with the pressure of said leakage fluid, said means including (1) means providing a counter-balancing passageway interconnecting said first non-sealing chamber with a mid-portion of said second frictional seal so as to establish a restricted flow of first ring chamber leakage fluid radially through said second seal from said mid-portion in one direction to said second ring chamber and in the opposite direction to said third ring chamber.

In the foregoing arrangement, the first and third rings may be spacer rings mounted on (or formed as an integral part of) the housing in which event the second ring is a sealing ring mounted on the shaft with its radially extending upstream and downstream side faces abutting the adjacent faces of the first and third spacer rings and cooperating therewith to form the first and second frictional seals.

The first frictional seal connects the first non-sealing ring chamber, which is within the first (spacer) ring, with the second non-sealing ring chamber, which encircles the second (sealing) ring and thus provides a pressure drop between the first and second non-sealing ring chambers. For the sake of clarity we assume a first ring chamber pressure of 8 pressure units and a second ring chamber pressure of 6 pressure units so that the pressure drop across the first frictional seal equals 2 pressure units. The fluid in this first frictional seal urges the sealing ring toward the low pressure end of the device with a force or end thrust of one order of magnitude equal to $7P \times A$ where $7P$ equals the average pressure within that seal and $A$ equals the area of the side face against which that average pressure is axially exerted.

Now, if the pressure of the leaking fluid were to drop from 6 pressure units in the second non-sealing ring chamber to 4 pressure units in the third ring chamber, then the average pressure within the second frictional seal may be $5P$. The second frictional seal therefore exerts a lower ($5PA$) end thrust in the counter-balancing direction leaving the second ring with a net axial load (corresponding to $2PA$) exerted in the direction of the low pressure end.

To avoid this axial load and achieve the purpose of my invention, I interconnect the second and third non-sealing ring chambers with a pressure equalizing passage to provide identical fluid pressures at opposite ends of the second frictional seal and then connect the first non-sealing ring chamber axially to a mid-portion of the second frictional seal so as to split the second seal and thereby leak fluid from the first ring chamber not only outwardly through the second frictional seal to the second ring chamber but also inwardly through that same seal to the third ring chamber.

Stated otherwise, I deliver leakage-fluid under a pressure of one order of magnitude to the annular inlet at one end of the first frictional seal and at the mid-portion of the second frictional seal and I interconnect the annular outlet at the other end of the first frictional seal with the outlets at both ends of the second frictional seal so as to discharge the leakage-fluid at all three places under another pressure of a lower order of magnitude and thereby provide the same average pressure across each frictional seal on opposite sides of a given sealing ring. If that given ring has equal areas for its opposed seals, it should have equal end thrusts.

In this way, the average pressure across the first seal is substantially reproduced across the outer portion of the second or split frictional seal and also across the inner portion thereof. Since the areas of the first and second seals are the same, the end thrust produced in the split frictional seal is equal and opposite to the end thrust produced in the first frictional seal; hence, the sealing ring is perfectly counter-balanced. This complete or substantially complete elimination of axial load permits the use of extremely close accurately-machined tolerances with relatively low rates of wear.

The invention is illustrated in the accompanying drawing wherein.

FIGS. 1–2

Conventional structure

Figure 2:
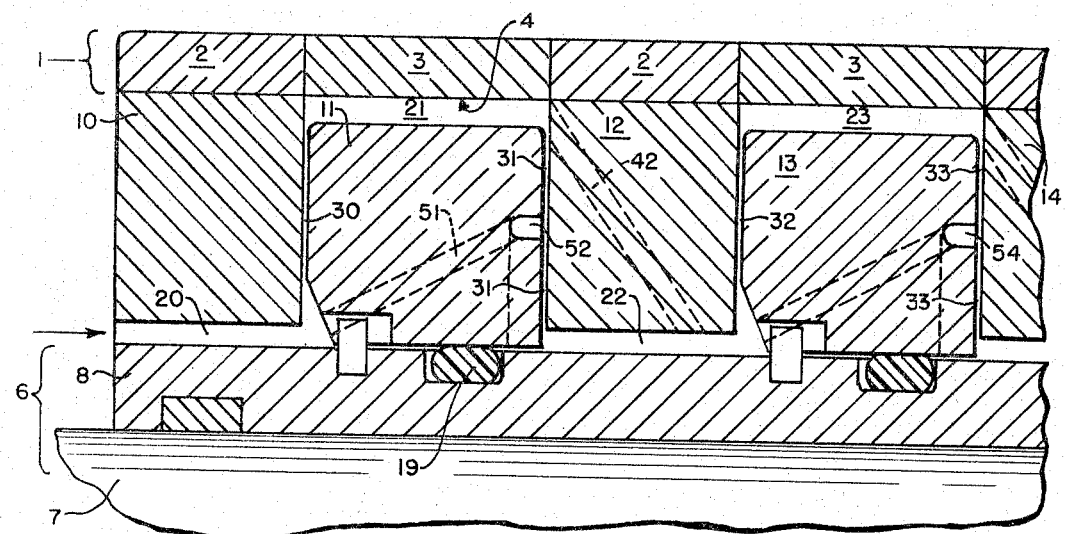
FIGURE 2 is an enlarged fragmentary vertical sectional view of the first two sealing rings and associated parts as they appear in the upper half of FIGURE 1 on the high pressure side thereof.

The rotary structure illustrated conventionally comprises: an outer stationary housing part 1 composed of a series of spaced annular parts 2 and an interposed series of annular parts 3, which axially abut the adjacent parts 2, all of these housing parts cooperating with each other to provide the wall 4 of a bore having high and low pressure ends, as indicated; and an inner rotatable shaft part 6 composed of a shaft 7 and a surrounding sleeve 8 suitably secured to it, this rotatable shaft part 6 being operatively mounted for relative rotation within said bore wall 4 with the peripheral surface of the shaft part 6 spaced inwardly from the bore wall 4 and cooperating therewith to form therebetween a cylinder of space which extends concentrically about the axis of rotation.

Inventive frictional ring seal

In accordance with the present invention, that concentric cylinder of space between the shaft and housing parts is provided with a ring seal composed of three elements which may be generally described as comprising: (A) a series of rings; (B) pressure-equalizing means; and (C) ring-balancing means.

*Rings.*—The ring element specifically illustrated includes a succession of nine axially-abutting shaft-encircling rings which, proceeding in the high-to-low pressure direction, are successively designated by numerals 10 through 18. All of these rings are arranged in the cylindrical space between said bore wall 4 and the shaft part 6. Each ring has radially-extending side faces and inner and outer peripheries, one periphery of which is mounted and the other free.

Thus alternate rings 10, 12, 14, 16 and 18 have their outer peripheries mounted on the housing part. The alternate rings may be formed integrally with the alternate ring-like housing parts 2 of the outer stationary housing part 1 although they are shown as being formed separately therefrom; it being understood that they are suitably and rigidly secured thereto. In other words, they are spacer rings.

The interposed or intermediate rings 11, 13, 15 and 17 have their inner peripheries mounted on the shaft part 6 and, more particularly, on the annular sleeve 8 of the shaft part. While these rings are normally made separately from the shaft part, they preferably are pinned, keyed or otherwise secured to the shaft part so as to rotate therewith. The mounted or inner periphery of each of the sealing rings 11, 13 and 15 is conventionally sealed to the shaft part by any suitable annular deformable seal 19 to prevent the axial flow of leakage fluid therebetween. In other words, these interposed rings are sealing rings.

The free periphery of each ring 10–18 is spaced from the adjacent part to form therebetween a non-sealing ring chamber, which accommodates a free flow of leakage fluid axially in the direction of the low pressure end. Thus the free inner peripheries of successive spacer rings 10, 12, 14, 16 and 18 cooperate with the shaft part to form therebetween corresponding non-sealing inner ring chambers 20, 22, 24, 26 and 28 while the free outer peripheries of successive sealing rings 11, 13, 15 and 17 cooperate with the housing part (and, more particularly, with the corresponding annular parts 3 of the housing) to form therebetween corresponding non-sealing outer ring chambers 21, 23, 25 and 27. It will be understood that a non-sealing ring chamber is one which not only accommodates an axial leakage flow but does so without appreciably restricting that flow.

It will also be appreciated that each frictional seal has its inner end annularly connected with an "inner" non-sealing ring chamber and its outer end annularly connected with an "outer" non-sealing ring chamber. For example, the first of the non-sealing spacer ring chambers 20, which is an inner chamber, is connected to the inner end of the first frictional seal 30, the outer end of which is connected to the next non-sealing ring chamber 21, which is an outer chamber, and this outer chamber is connected to the outer end of the second frictional seal 31, the inner end of which is connected to the next inner non-sealing spacer ring chamber 22, which is an inner chamber.

*Pressure equalizing means.*—In carrying out the present invention, each outer non-sealing ring chamber (except the last) is connected to the next inner non-sealing ring chamber (i.e. the ring chamber which is next in the direction of the low presure end) by a pressure equalizing passageway so as to establish substantially identical fluid pressures at opposite ends of the second frictional seal. To this end, outer ring chamber 21 is connected to the next inner ring chamber 22 by means of a pressure equalizing passageway 42 in spacer ring 12.

Similarly, successive outer and inner ring chambers 23 and 24 are interconnected by equalizing passageway 44 drilled through spacer ring 14 while successive outer and inner ring chambers 25 and 26 are interconnected by pressure equalizing passageway 46 in spacer ring 16. As indicated, outer chamber 27 and inner chamber 28 are not interconnected by an equalizing passageway because both of them are vented to atmosphere.

These pressure equalizing connections prevent the flow of leakage fluid from any one of the outer non-sealing ring chambers inwardly through the adjacent second frictional seal into the next of the inner non-sealing ring chambers.

The axially-abutting faces of rings 10–18 cooperate with each other to form one series of first frictional seals, one such seal on the upstream side of each sealing ring. Thus a first friction seal 30 is formed by the axially-abutting faces of spacer ring 10 and sealing ring 11 to extend radially therebetween from the non-sealing ring chamber 20 within spacer ring 10 to the non-sealing chamber 21 around the sealing ring 11. Similarly, first frictional seals 32, 34 and 36 are respectively formed between the axially-abutting faces of rings 12–13, 14–15 and 16–17.

The axially-abutting faces of rings 10–18 also cooperate with each other to form one series of second frictional seals, one such seal on the downstream side of each sealing ring. Thus a second frictional seal 31 is formed by the axially-abutting faces of sealing ring 11 and spacer ring 12 to extend radially from a non-sealing ring chamber 21 around the outer side of sealing ring 11 to the non-sealing chamber 22 within spacer ring 12. Similarly, second frictional seals 33, 35 and 37 are respectively formed between the axially-abutting faces of rings 13–14, 15–16 and 17–18.

*Ring-balancing means.*—In completing the present invention means is provided to interconnect each inner non-sealing chamber at the inner end of each first frictional seal with the mid-portion of the next of the second frictional seals (i.e. the second frictional seal which is next in the direction of the low pressure end) so as to split the second seal and thereby establish, in its mid-portion, the same fluid pressure which is already established at the inner end of the next preceding first frictional seal. In other words, leakage fluid is fed into the fluid inlets of each pair of first and second seals at the same pressure.

With a given fluid pressure at the inner (inlet) end of one first frictional seal, there is established a restricted flow of leakage fluid outwardly through that first frictional seal from the inner ring chamber at its inner end to the outer ring chamber at its outer end. With the same fluid pressure at the mid-portion inlet of the next second or split frictional seal, there will be established two more restricted flows of leakage fluid, one proceeding from the mid-portion inlet of that split frictional seal outwardly in one direction (to the outer ring chamber at the outer end of that split frictional seal) and the other proceeding inwardly in the opposite direction (to the inner ring chamber at the inner end of that same split second frictional seal).

Accordingly, an annular groove is formed in the mid-portion of either or both the downstream face of each sealing ring 11, 13, 15 and 17 or the upstream face of each spacer ring 12, 14, 16 and 18 and an axial balancing passageway is drilled through each sealing ring to connect that groove with the next preceding inner non-sealing chamber. For this purpose, the first non-sealing chamber 20 is connected by axial passageway 51 drilled through sealing ring 11 to groove 52 which proceeds annularly in and along the mid-portion of either sealing ring 11 or spacer ring 12 so as to provide for the free flow of leakage fluid from inner ring chamber 20 through axial passageway 51 to mid-portion groove 52 and for the restricted flow thereof from groove 52 not only outwardly through the outer portion of the second frictional seal 31 to the outer non-sealing ring chamber 21 but also inwardly through the inner portion of the second frictional seal 31 to the inner non-sealing ring chamber 22.

Similarly, other axial balancing passageways and mid-portion grooves are provided including axial balancing passageway 53 in sealing ring 13 and mid-portion groove 54 in the second frictional seal 33, passageway 55 in sealing ring 15 and mid-portion groove 56 in the second frictional seal 35, and passageway 57 in sealing ring 17 and mid-portion groove 58 in split seal 37. A definite but small clearance will normally be provided in all frictional seals but the last seal (37) may not have any definite clearance.

*Operation*

Since the foregoing description of structure is believed to render the operation clear, it should suffice to say: that leakage fluid from the high pressure end flows successively through inner ring chamber 20, first frictional seal 30, outer ring chamber 21 and balancing passageway 42 to inner ring chamber 22; that such flow creates, in said first seal 30, an end thrust toward the low pressure end; that leakage fluid from said high pressure end also flows successively through inner ring chamber 20, counterbalancing passageway 51 and annular groove 52 where it splits into two flows, one proceeding outwardly through the outer portion of the second frictional seal 31 to the outer ring chamber 21 and the other proceeding inwardly through the inner portion of the second frictional seal 31 to the inner ring chamber 22; that such split flow creates in seal 31 a counterbalancing end thrust toward the high pressure end; and that the counterbalancing end thrust of the second seal 31 may be and preferably is equal to the oppositely directed end thrust in the first seal 30.

The same operation is repeated from inner ring chamber 22 to inner ring chamber 24 in seals 32 and 33 and from chamber 24 to 26 in seals 34 and 35. In each case, the same counterbalancing result is obtained.

Where axial counterbalancing passageway 57 is provided in ring 17, the same counterbalancing result will be obtained. If 57 is omitted, there normally will be a slight loading of sealing ring 17.

FIG. 3

*Modification*

In this modification, the shaft or housing mounting of the rings and the inner or outer location of the non-sealing ring chambers are reversed. For example: the spacer rings are mounted on the shaft part so that their respective non-sealing chambers are adjacent the housing while the sealing rings are mounted on the housing part so that their respective non-sealing ring chambers are adjacent the shaft part.

Figure 3:
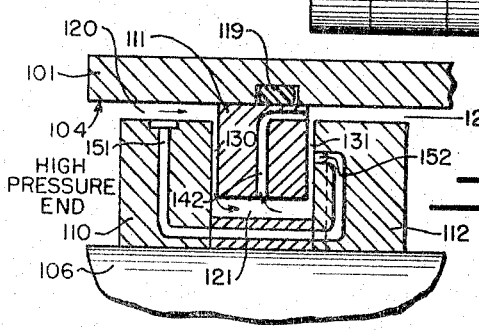
FIGURE 3 shows a modification in a view somewhat similar to FIGURE 2.

In carrying out my invention, only two successive frictional seals are essential; hence in the modification of FIG. 3, only two such seals involving three rings are shown.

As illustrated, the FIG. 3 modification comprises: (A) an outer stationary housing part 101 providing a cylindrical bore wall 104 having high and low pressure ends; (B) an inner rotatable shaft part 106 operatively mounted for relative rotation within said bore wall 104 and inwardly spaced therefrom; (C) a series of three axially-abutting shaft-encircling rings arranged within said bore wall, the first and third rings 110 and 112 being mounted on shaft part 106 through their respective inner peripheries with their respective free peripheries spaced from the housing part 101, the second ring 111 being mounted on the housing part 101 through its outer periphery with its inner free periphery spaced from the shaft part 106, (1) all of said rings 110–112 cooperating to form (a) corresponding first, second and third non-sealing ring chambers 120, 121 and 122, each of which extends axially (between the free periphery of its ring and the adjacent part) to conduct leakage fluid axially in the direction of the low pressure end, (b) a first frictional seal 130 extending radially between the adjacent side faces of the first and second rings 110–111 to restrict the radial flow of leakage fluid from the first chamber 120 inwardly to the second chamber 121, and (c) a second frictional seal 131 extending radially between the adjacent faces of the second and third rings 111–112; (D) means providing a pressure equalizing passageway 142 interconnecting said second and third non-sealing chambers 121–122 to establish identical fluid pressures at the outlet end of the first frictional seal 130 and at opposite ends of said second frictional seal 131; and (E) means for balancing said second ring 111 axially with the pressure of said leakage fluid, said means including (1) means providing a counterbalacing passageway 151 interconnecting said first non-sealing chamber 120 with the mid-portion groove 152 of said second frictional seal 131 so as to establish a restricted flow of leakage fluid radially through said second frictional seal 131 from said mid-portion in one direction to said second chamber 121 and in the opposite direction to said third chamber 122.

Where the use of more than one pair of first and second frictional seals is desirable, it will be understood that one sealing ring and one spacer ring will be added for each additional pair of seals. Each sealing ring will be conventionally sealed to the housing part 101 by a deformable annular seal 119 compressed in a suitable groove in the housing part. While the sealing rings of my invention are sealed by 119 (and 19) against axial leakage, they normally can move axially to a slight degree at least.

Figure 1:
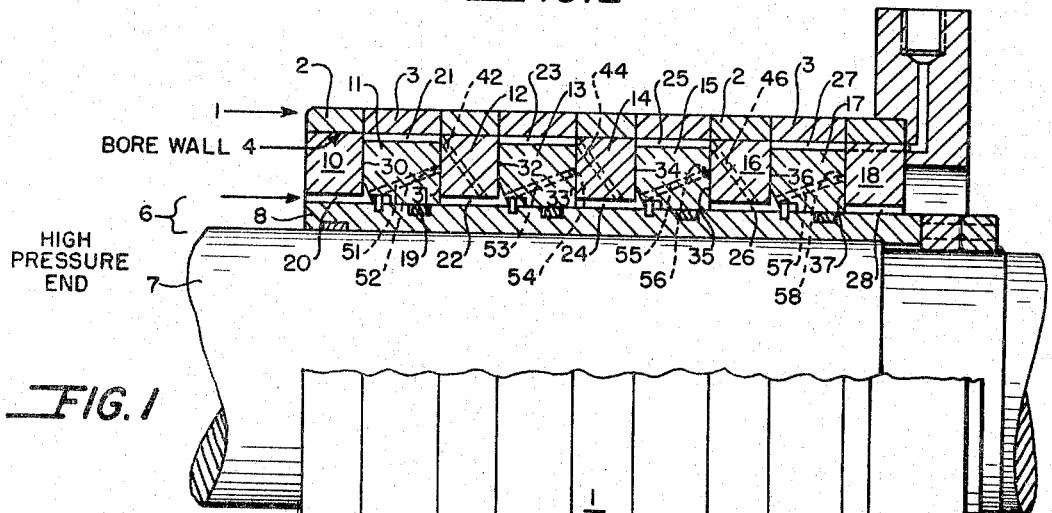
FIGURE 1 is a side view of a frictional ring seal constructed in accordance with my invention for use in rotary pumps, turbines, compressors and like devices of the high-speed, high-pressure type, the upper half of the seal being shown in vertical axial section and the lower half thereof in side elevation.

Each of the rotary seals shown in the FIGS. 1–2 and FIG. 3 embodiments is characterized by three axially-abutting rings alternately providing inner and outer ring chambers and cooperatively providing first and second frictional seals on the upstream-facing and downstream-facing sides, respectively, of the second or middle sealing ring. The first frictional seal extends from its inlet end which communicates with the first ring chamber radially to its outlet end which communicates with the second ring chamber. The second frictional seal extends from the second ring chamber radially to the third ring chamber and communicates with both. My invention resides in providing the second frictional seal with a mid-portion inlet so that its inner and outer ends both functon as outlets, in interconnecting the end inlet of the first frictional seal with the mid-portion inlet of the second frictional seal and in interconnecting the end outlet of the first fricitonal seal with both end outlets of the second frictional seal.

Having described my invention, I claim:

1. An axially-balanced frictional ring seal for controlling the axial flow of leakage fluid along the rotary shaft of rotary pumps, turbines, compressors and the like, comprising:
   (A) an outer stationary housing part providing a cylindrical bore wall having high and low pressure ends;
   (B) an inner rotatable shaft part operatively mounted for relative rotation within the said bore wall and inwardly spaced therefrom;
   (C) a series of three axially-abutting shaft-encircling rings arranged within said bore wall,
      (1) the first and third rings being mounted on one part through one of their inner and outer peripheries with their other remaining or free peripheries separate from the other part,
      (2) the second ring being mounted on the other part through the other of its inner and outer peripheries with its remaining free periphery separate from said one part,
      (3) said rings cooperating to form
         (a) a first frictional seal extending radially between the adjacent faces of the first and the second rings from an annular inlet adjacent one of its ends to an annular outlet adjacent the other of its ends, and
         (b) a second frictional seal extending radially between the adjacent faces of the second and third rings from an annular inlet adjacent its mid-portion to annular outlets adjacent its opposite inner and outer ends;
   (D) means for feeding leakage fluid at the same pressure to the inlets of the first and second frictional seals; and
   (E) pressure equalizing passageway means interconnecting the outlet of the first frictional seal with both outlets of the second frictional seal.

2. The seal of claim 1 wherein:
   (A) the free periphery of said first ring is spaced from the adjacent part to form therebetween a first non-sealing annnular ring chamber for directing leakage fluid into the annular inlet end of the first frictional seal.

3. The seal of claim 1 wherein:
   (A) the free periphery of said second ring is spaced from the adjacent part to form therebetween a corresponding non-sealing annular ring chamber leading from the annular outlet end of the first frictional seal to the corresponding one of said two annular outlet ends of the second frictional seal.

4. The seal of claim 3 wherein:
   (A) the free periphery of said third ring is spaced from the adjacent part to form therebetween a corresponding non-sealing annular ring chamber leading from the other of said two annular outlet ends of the second frictional seal.

5. The seal of claim 1 including:
   (A) means providing an annular groove along the mid-portion of the second frictional seal.

References Cited by the Examiner
UNITED STATES PATENTS

| | | | |
|---|---|---|---|
| 2,921,805 | 1/1960 | Shevchenko | 277—62 |
| 3,119,623 | 1/1964 | Shevchenko | 277—3 |
| 3,179,422 | 4/1965 | Phillips | 277—3 |

SAMUEL ROTHBERG, *Primary Examiner.*